US011932581B1

(12) United States Patent
Agarwal et al.

(10) Patent No.: US 11,932,581 B1
(45) Date of Patent: Mar. 19, 2024

(54) FOAMS OF NANOMATERIALS AND FABRICATION METHODS THEREOF

(71) Applicants: Arvind Agarwal, Miami, FL (US); Kazue Orikasa, Miami, FL (US); Tyler Dolmetsch, Miami, FL (US); Tony Thomas, Miami, FL (US)

(72) Inventors: Arvind Agarwal, Miami, FL (US); Kazue Orikasa, Miami, FL (US); Tyler Dolmetsch, Miami, FL (US); Tony Thomas, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/454,169

(22) Filed: Aug. 23, 2023

(51) Int. Cl.
*C04B 35/80* (2006.01)
*B01J 13/00* (2006.01)
*C04B 35/626* (2006.01)
*C04B 38/06* (2006.01)
*C04B 41/00* (2006.01)
(Continued)

(52) U.S. Cl.
CPC ........... *C04B 35/80* (2013.01); *B01J 13/0091* (2013.01); *C04B 35/62655* (2013.01); *C04B 38/0605* (2013.01); *C04B 41/0072* (2013.01); *C04B 41/4535* (2013.01); *C04B 41/48* (2013.01); *C04B 41/83* (2013.01); *C08J 5/005* (2013.01); *C04B 2235/386* (2013.01); *C04B 2235/5284* (2013.01); *C04B 2235/5292* (2013.01); *C04B 2235/606* (2013.01); *C08K 2003/385* (2013.01)

(58) Field of Classification Search
CPC ......... B01J 3/0091; F26B 5/005; F26B 5/065; C08J 5/005; C04B 38/0605; C08K 2003/385
See application file for complete search history.

(56) References Cited

U.S. PATENT DOCUMENTS

| 4,138,502 A | * | 2/1979 | Ehrgott | A23F 5/32 426/515 |
| 2012/0306977 A1 | * | 12/2012 | Komatsu | B41J 2/01 347/100 |
| 2016/0227644 A1 | * | 8/2016 | Hirotsuru | H05K 1/0271 |

FOREIGN PATENT DOCUMENTS

| CN | 104788959 A | * | 7/2015 | |
| CN | 109666263 A | * | 4/2019 | ............. C08L 63/00 |

(Continued)

OTHER PUBLICATIONS

DIC Corporation, Epiclon Standard Products Epoxy resins and Curing Agents (2013).*

(Continued)

*Primary Examiner* — Kregg T Brooks
(74) *Attorney, Agent, or Firm* — Saliwanchik, Lloyd & Eisenschenk (57) ABSTRACT

Foams and methods of fabricating and using the same are provided. The foams can be three-dimensional (3D), free-standing, and/or rigid and can be used as, for example, nanofiller networks. The shape and size of the foam pore interconnected network can be tailorable/tailored. The foams can be, for example, hybrid one-dimensional (1D)/two-dimensional (2D) foams of 1D and 2D materials (e.g., hybrid boron nitride nanotube (BNNT)/boron nitride nanoplatelet (BNNP) foams). A freeze-drying-based method can be used to fabricate bulk porous foam, which can be used for, e.g., nanofiller for polymer nanocomposites.

11 Claims, 8 Drawing Sheets

(51) Int. Cl.
*C04B 41/45* (2006.01)
*C04B 41/48* (2006.01)
*C04B 41/83* (2006.01)
*C08J 5/00* (2006.01)
*C08K 3/38* (2006.01)

(56) References Cited

FOREIGN PATENT DOCUMENTS

| CN | 112175238 A | * | 1/2021 | ............. C08K 3/041 |
| CN | 112607726 A | * | 4/2021 | |
| CN | 113120885 A | * | 7/2021 | |
| KR | 20210048640 A | * | 5/2021 | |

OTHER PUBLICATIONS

Partial machine translation of CN-113120885-A (2021).*
Partial machine translation of CN-109666263-A (2019).*
Partial machine translation of KR-20210048640-A (2021).*
Partial machine translation of CN-112607726-A (2021).*
Partial machine translation of CN-112175238-A (2021).*
Partial machine translation of CN-104788959-A (generated Jan. 11, 2024).*

* cited by examiner

FOAMS OF NANOMATERIALS AND FABRICATION METHODS THEREOF

GOVERNMENT SUPPORT

This invention was made with government support under 80NSSC22K1190 awarded by the National Aeronautics and Space Administration. The government has certain rights in the invention.

BACKGROUND

One-dimensional (1D) materials, such as carbon nanotubes (CNTs), and two-dimensional (2D) materials, such as graphene nanoplatelets (GNPs), have been extensively used as effective mechanical, thermal, and electrical reinforcement in polymer matrices. However, CNTs, GNPs, and other commonly-used 1D and 2D materials have significant limitations.

BRIEF SUMMARY

Embodiments of the subject invention provide novel and advantageous foams and methods of fabricating and using the same. The foams can be three-dimensional (3D), free-standing, and/or rigid and can be used as, for example, nanofiller networks. The shape and size of the foam pore interconnected network can be tailorable/tailored. The foams can be, for example, hybrid one-dimensional (1D)/two-dimensional (2D) foams of 1D and 2D materials (e.g., hybrid boron nitride nanotube (BNNT)/boron nitride nanoplatelet (BNNP) foams). A freeze-drying-based method can be used to fabricate bulk porous foam (e.g., hybrid 1D/2D foam, such as hybrid BNNT/BNNP foam), which can be used for, e.g., nanofiller for polymer nanocomposites.

In an embodiment, a method of fabricating a foam can comprise: preparing a slurry of slurry components, the slurry components comprising a freezing agent and a primary material of the foam; and freeze-drying the slurry (e.g., at a temperature in a range of from −95° C. and 30° C., such as below 25° C., below −30° C., or below −55° C.) to give the foam comprising the primary material. The foam can be free-standing, 3D, and/or rigid. The foam can comprise a lamellar microstructure. The primary material can comprise: a first material that is a 2D nanomaterial (e.g., BNNP) or a 1D nanomaterial (e.g., BNNT); and/or a second material that is a 2D nanomaterial (e.g., BNNP) or a 1D nanomaterial (e.g., BNNT). For example, the first material can be a 2D nanomaterial, and the second material can be a 1D nanomaterial, and the foam can be a hybrid 1D/2D foam. For example, the first material can be BNNP and the second material can be BNNT, and the foam can be a hybrid BNNT/BNNP foam. The preparing of the slurry can comprise vortex mixing and/or sonication of the slurry components. The freeze-drying can comprise freezing the slurry and sublimation of at least a part of the slurry (e.g., the entire slurry). The freezing agent can be, for example, water (e.g., deionized water), acetone, or camphene, though embodiments are not limited thereto. The slurry components can further comprise a binding agent and/or a dispersing agent. The foam can have a porosity of, for example, at least 80% (e.g., at least 85%, at least 90%, at least 91%, at least 92%, at least 93%, at least 94%, at least 95%, at least 96%, at least 97%, at least 97.5%, or at least 98%).

In another embodiment, a method of fabricating a foam-polymer composite (e.g., foam-polymer nanocomposite) can comprise: forming a foam (including any or all steps/features discussed in the previous paragraph); pouring a liquid polymer on the foam within a reaction chamber, a pressure of the reaction chamber being at least 0.5 atmosphere (atm) (e.g., at least 0.8 atm, such as 1 atm or about 1 atm) during the pouring of the liquid polymer; lowering the pressure of the reaction chamber to less than 105 Pa (e.g., 101.3 Pa, or less than 100 Pa, or less than 10 Pa, such as 1 Pa or about 1 Pa) such that the liquid polymer matrix infiltrates the foam (and/or the foam infiltrates the matrix of the polymer) in a non-agglomerated fashion (e.g. uniformly dispersed or substantially uniformly dispersed) to give a foam-polymer mixture; and heating the foam-polymer mixture to cure the polymer and give the foam-polymer composite (e.g., heating at a temperature of at least 25° C. (for example, at least 70° C.) for at least 20 minutes). The liquid polymer can infiltrate the foam such that the foam-polymer composite has a porosity of no more 5% (e.g., no more than 4%, no more than 3%, no more than 2%, no more than 1%, no more than 0.5%, no more than 0.1%, or 0%). The liquid polymer can fully infiltrate the foam such that the foam-polymer composite has no pores (i.e., porosity of 0%). The polymer can have a viscosity of, for example, no more than 5 Pascal-seconds (Pa-s) (e.g., no more than 3.5 Pa-s), though embodiments are not limited thereto.

In another embodiment, a foam can comprise a primary material, the primary material comprising: a first material that is a 2D nanomaterial (e.g., BNNP) or a 1D nanomaterial (e.g., BNNT); and/or a second material that is a 2D nanomaterial (e.g., BNNP) or a 1D nanomaterial (e.g., BNNT). For example, the first material can be a 2D nanomaterial, and the second material can be a 1D nanomaterial, and the foam can be a hybrid 1D/2D foam. For example, the first material can be BNNP and the second material can be BNNT, and the foam can be a hybrid BNNT/BNNP foam. The foam can: include a lamellar microstructure; be free-standing, 3D, and/or rigid; and/or can have a porosity of at least 80% (e.g., at least 85%, at least 90%, at least 91%, at least 92%, at least 93%, at least 94%, at least 95%, at least 96%, at least 97%, at least 97.5%, or at least 98%). The foam comprise a plurality of bridges of the 1D nanomaterial (e.g., BNNT) each connecting, and being bonded to, two individual particles of the 2D nanomaterial (e.g., BNNPs).

In another embodiment, a foam-polymer composite (e.g., foam-polymer nanocomposite) can comprise: a polymer; and a foam as disclosed herein. The foam can infiltrate a matrix of the polymer (and/or the matrix of the polymer can infiltrate the foam) in a non-agglomerated fashion (e.g. uniformly dispersed or substantially uniformly dispersed). The foam-polymer composite can have a porosity of no more 5% (e.g., no more than 4%, no more than 3%, no more than 2%, no more than 1%, no more than 0.5%, or no more than 0.1%). The foam-polymer composite can be non-porous (i.e., have no pores or a porosity of 0%). The foam-polymer composite can be, for example, a hybrid BNNT/BNNP-polymer composite (e.g., a hybrid BNNT/BNNP-polydimethylsiloxane (PDMS) composite).

BRIEF DESCRIPTION OF DRAWINGS

FIGS 1a-1c combine to show a phase diagram, with pressure on the y-axis, temperature on the x-axis, FIG. 1a being the liquid portion of the diagram, FIG. 1b being the solid portion of the diagram, and FIG. 1c being the gas portion of the diagram.

FIG. 1a also shows aligned walls and wall bridges. The scale bars are 100 micrometers (μm), 50 μm, 10 μm, and 1 μm for FIGS. 2a-2d, respectively.

FIG. 4d shows BNNT/BNNP walls and a foam pore. The scale bars are 0.5 millimeters (mm), 50 μm, 10 μm, and 1 μm for FIGS. 4a-4d, respectively.

FIG. 5d shows a BNNT bridge between individual BNNPs. The scale bars are 1 μm, 500 nanometers (nm), 100 nm, and 100 nm for FIGS. 5a-5d, respectively.

DETAILED DESCRIPTION

Embodiments of the subject invention provide novel and advantageous foams and methods of fabricating and using the same. The foams can be three-dimensional (3D), freestanding, and/or rigid and can be used as, for example, nanofiller networks. The shape and size of the foam pore interconnected network can be tailorable/tailored. The foams can be, for example, hybrid one-dimensional (1D)/two-dimensional (2D) foams of 1D and 2D materials (e.g., hybrid boron nitride nanotube (BNNT)/boron nitride nanoplatelet (BNNP) foams). A freeze-drying-based method can be used to fabricate bulk porous foam (e.g., hybrid 1D/2D foam, such as hybrid BNNT/BNNP foam), which can be used for, e.g., nanofiller for polymer nanocomposites. The foams have excellent radiation shielding, thermally conducting, and mechanically reinforcing properties. The foams can be used in various fields, including electronic packaging, structural components, and radiation shielding technologies. The integration of the foams into different polymer matrices can help develop advanced and tailorable polymer nanocomposites with excellent thermal, mechanical, and/or radiation shielding properties.

Boron nitride (BN)-based nanomaterials, such as 1D BNNTs and 2D BNNPs, are outstanding nanofillers due to their superior mechanical strength, tribological properties, high thermal conductivity, electrically insulating behavior, piezoelectric properties, neutron shielding capability, and oxidation resistance. BNNTs are 1D nanotube-shaped structures including a hexagonal boron (B)-nitrogen (N) bonding network with partial ionic properties due to the difference in the electronegativity of B and N. BNNTs possess excellent mechanical properties, such as a high tensile strength (e.g., 30 gigapascals (GPa)) and a high Young's modulus (e.g., 850 GPa). In addition, the thermal conductivity of BNNTs is (e.g., up to 200 Watts per meter per Kelvin (W/m-K) or more).

BNNPs are 2D nanoplatelet-shaped particles including a hexagonal B—N bonding network. BNNPs exhibit highly anisotropic thermal and mechanical properties. BNNPs exhibit a basal-plane thermal conductivity of, e.g., 600 W/m-K and a through-plane thermal conductivity of, e.g., 30 W/m K. Similarly, the mechanical behavior of 2D materials is governed by their extremely high basal-plane stiffness and strength. In contrast, the through-plane strength of 2D materials is significantly lower than the basal-plane stiffness and strength.

Embodiments of the subject invention provide the integration of 1D materials (e.g., BNNT) and 2D materials (e.g., BNNP) into polymer nanocomposites, enabling additional multidirectional pathways to stress and phonon transfer mechanisms. The hybrid 1D/2D foam-polymer composites exhibit further enhanced mechanical and thermal properties. The hybrid 1D/2D foam network provides the polymer matrix with neutron radiation absorption sites, a phonon transfer network, and stress distribution pathways.

While carbon nanotubes (CNTs) and graphene nanoplatelets (GNPs) oxidize at 400° C. and can be decomposed at 700° C. due to their inferior thermal stability, BNNTs and BNNPs retain their structural stability and thermal properties up to 850° C. in air. This superior thermal stability translates into a remarkable advantage of BN-based nanomaterials over carbon (C)-based nanomaterials. An additional advantage BN-based nanomaterials have over C-based nanomaterials is related to their neutron radiation shielding properties. The $^{10}$Boron isotope ($^{10}$B) has a thermal neutron capture cross-section of 200 barns, while the $^{12}$Carbon ($^{12}$C) isotope has a capture cross-section of 0.002 barns, five orders of magnitude in difference. In addition, $^{10}$B has a fast neutron capture cross-section of 0.4 barns, while $^{12}$C has a capture cross-section of 0.00001 barns, more than four orders of magnitude in difference. These radiation shielding property differences further establish the superiority of BN-based nanomaterials over C-based nanomaterials for aerospace technologies. It is noted that a barn (e.g., $^{10}$B has a thermal neutron capture cross-section of 200 barns) is a unit of area used to measure the reaction cross section of atomic nuclei and subatomic particles in the study of their interactions with other nuclei or particles; one barn is equal to $10^{-24}$ square centimeters ($cm^2$).

In addition, GNPs do not have a tunable band gap and, thus, cannot be used for insulating applications. In contrast, due to their semiconducting nature, BN-based nanomaterials overcome this limitation (band gap, E g =6.08 electron Volts (eV)) and can be applied to insulating applications. Thus, BN-based materials are excellent nanofiller candidates for electronic packaging, as they can avoid short circuits and maintain signal integrity.

BN-based nanomaterials overcome the challenges faced by C-based nanomaterials. Due to these excellent properties, hybrid BNNT/BNNP foam-polymer composites can be applied in multiple areas, such as lightweight structures, solid lubricants, electronic packaging, structural components, and/or radiation shielding technologies in harsh environment applications.

Achieving a uniform dispersion with conductive nanofillers in polymer matrices has always been challenging due to the re-stacking of layers, non-uniformity in distribution, higher inter-sheet contact resistance, and Van der Waals forces. Embodiments of the subject invention overcome these challenges by consolidating 1D materials (e.g., BNNTs) and 2D materials (e.g., BNNPs) into a rigid, free-standing 3D foam structure. The 3D foam architecture with a highly connected microporous structure can provide ultralow-density behavior to the structure of the hybrid 1D/2D foam-polymer composite.

Figures 1A, 1B, 1C:
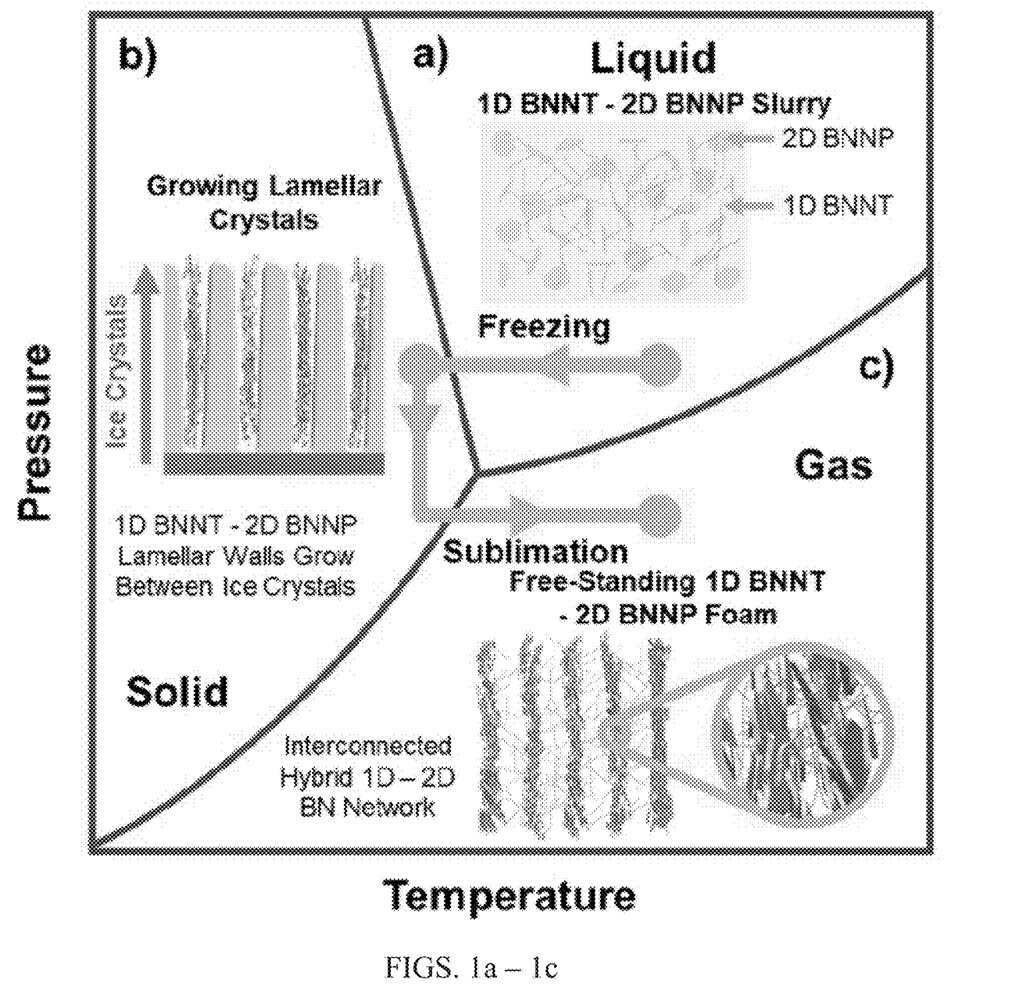
FIGS. 1a-1c show a process flow for freeze-drying of hybrid one-dimensional (1D)/two-dimensional (2D) foams (e.g., boron nitride nanotube (BNNT)/boron nitride nanoplatelet (BNNP) foams), including freezing and sublimation, according to an embodiment of the subject invention.
Figures 2A, 2B, 2C, 2D:
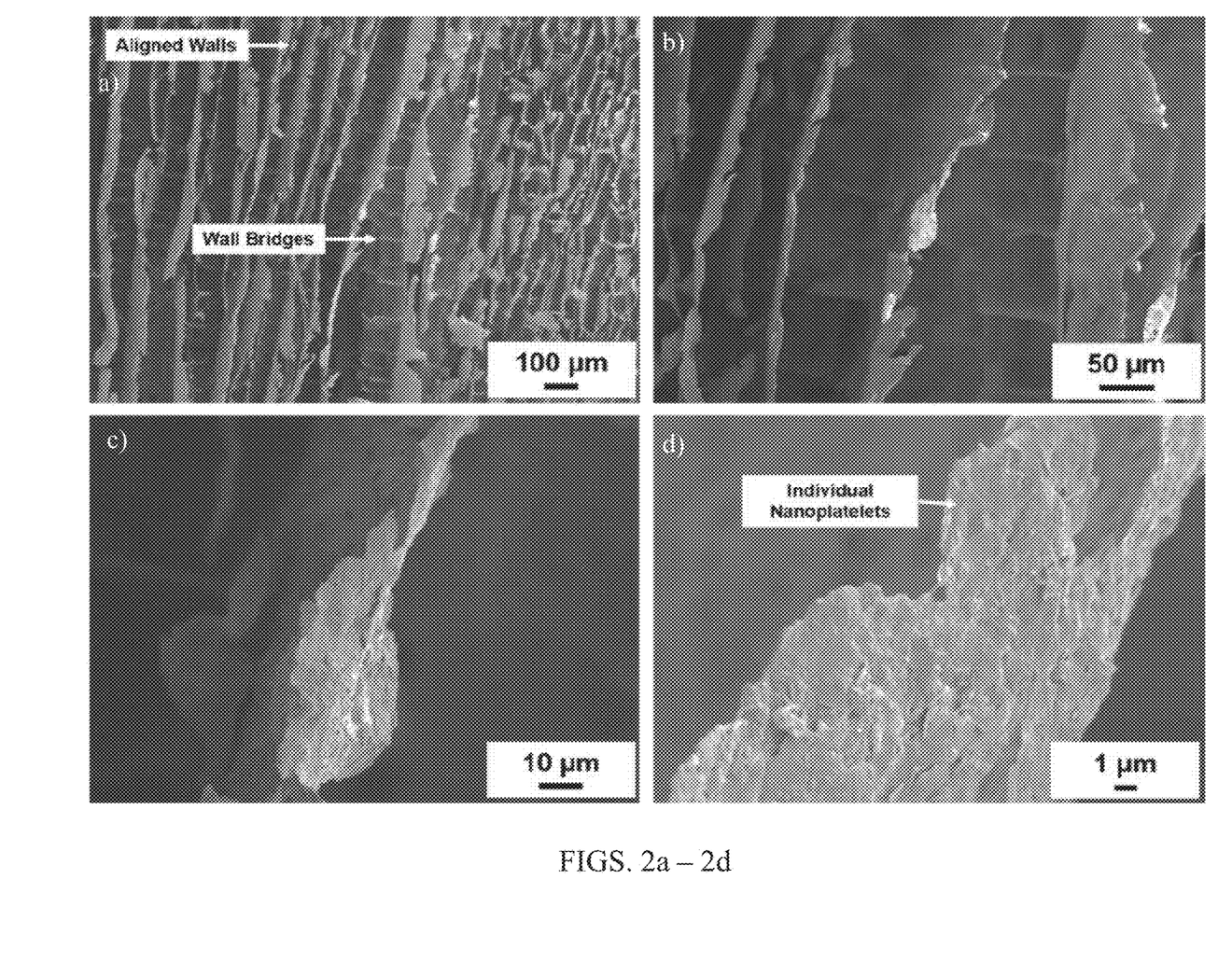
FIGS. 2a-2d show microscope images of BNNP foam, showing a lamellar microstructure with individual boron nitride (BN) nanoplatelets bonded together.
Figure 3A:
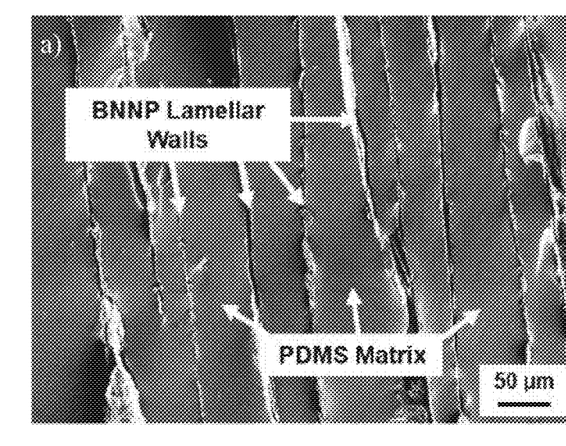
FIGS. 3a-3d show microscope images of BNNP foam infiltrated with polydimethylsiloxane (PDMS), showing a strong interface between the BNNP foam and the matrix of the PDMS. The scale bars are 50 μm, 10 μm, 50 μm, and 10 μm for FIGS. 3a-3d, respectively.
Figure 3B:
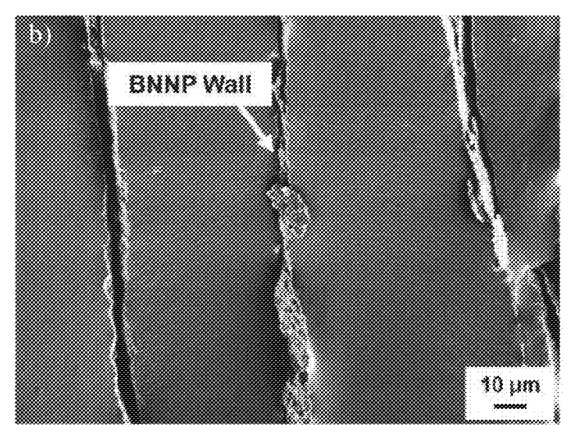
Figure 3C:
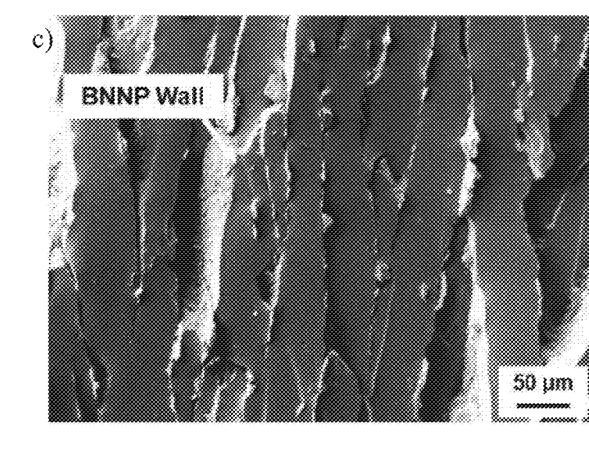
Figure 3D:
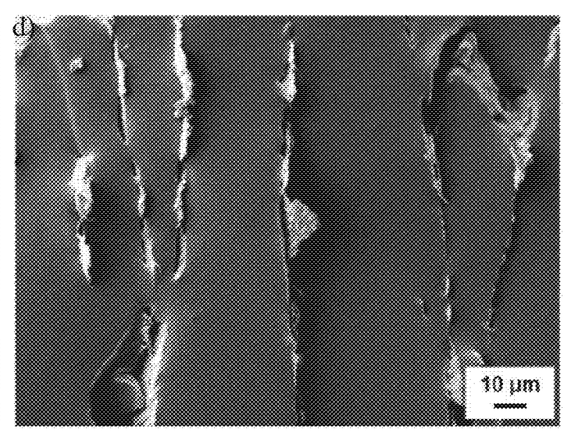
Figure 4A:
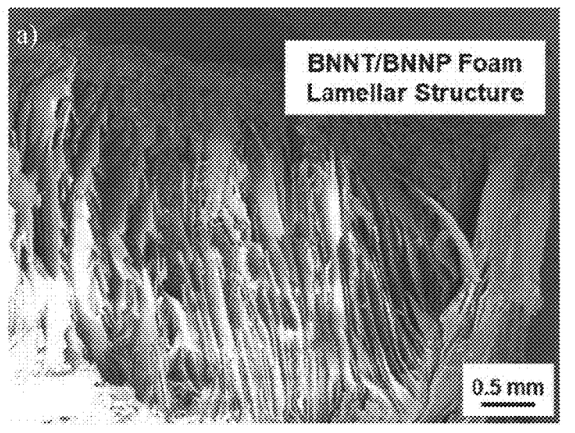
FIGS. 4a-4d show microscope images of hybrid BNNT/BNNP foam, showing a lamellar microstructure.
Figure 4B:
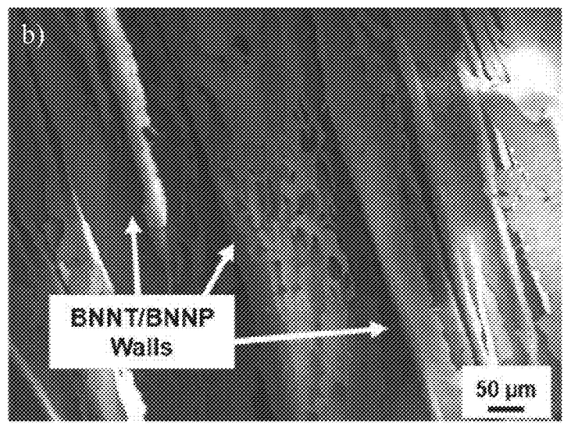
Figure 4C:
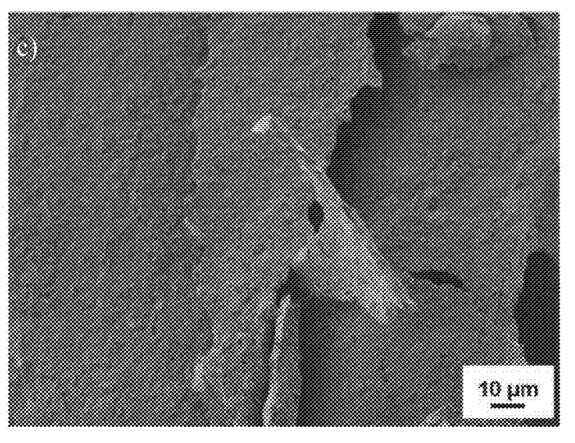
Figure 4D:
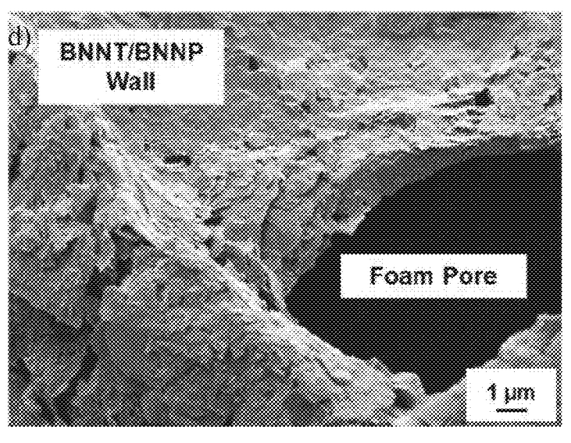
Figures 5A, 5B, 5C, 5D:
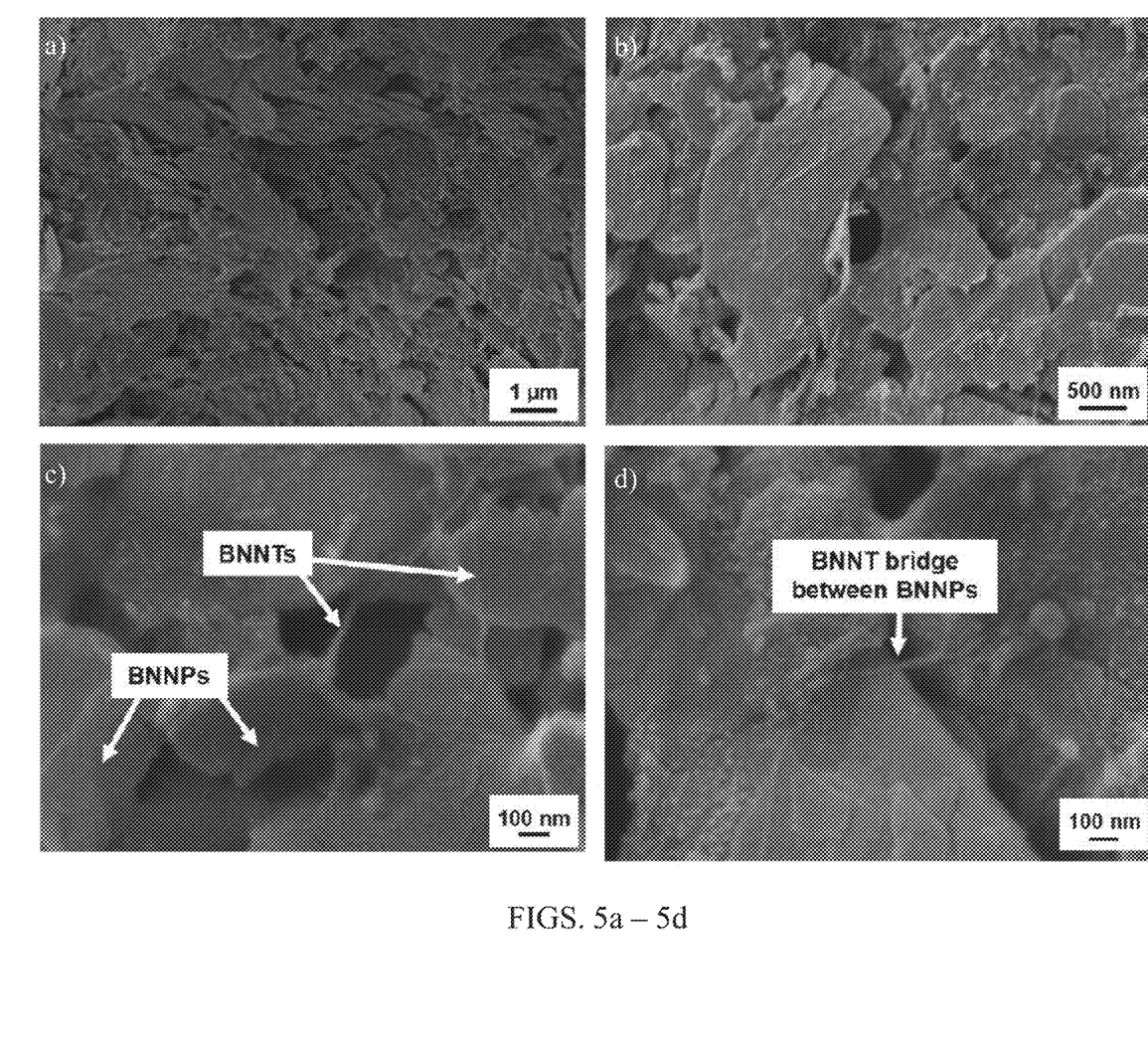
FIGS. 5a-5d show microscope images of hybrid BNNT/BNNP foam, showing hybrid BNNT/BNNP foam walls including individual BN nanoplatelets and BN nanotubes bonded together.

FIGS. 1a-1c show a process flow for freeze-drying of 1D/2D hybrid foams (e.g., hybrid BNNT/BNNP foams), including freezing and sublimation, according to an embodiment of the subject invention. Though FIGS. 1a-1c lists certain materials, this is for exemplary purposes only and should not be construed as limiting. Referring to FIG. 1a, a slurry can be prepared and can include the primary material for the final foam and a freezing agent (e.g., water, such as deionized water, or acetone or camphene) and optionally a binder (e.g., styrene-butadiene rubber (SBR)) and/or a dispersant (e.g., carboxymethyl cellulose (CMC), such as CMC sodium). The primary material can include a 1D material (e.g., BNNT) and/or a 2D material (e.g., BNNP). The slurry preparation can include vortex mixing and/or sonication (e.g., bath sonication and/or tip sonication). Referring to FIG. 1b, the prepared slurry (after dispersion) can be frozen (e.g., at a temperature below of 25° C. or below (for example, below −30° C.), such as −56° C.) to give a solid structure. The freezing can be performed for a predetermined period of time (e.g., at least 1 hour, such as at least 4 hours, or about 4 hours). Ice crystals and/or 1D-lamellar walls or crystals of the 1D and 2D materials (e.g., between the ice crystals) can grow during the freezing. The freezing can take place at a pressure of, for example 1 atmosphere (atm) or about 1 atm, though embodiments are not limited thereto. The solid structure can then be sublimated by lowering the pressure (e.g., to less than 100 Pascals (Pa), such as less than 10 Pa, such as 1 Pa or about 1 Pa) and/or changing the temperature to give the 3D foam. The sublimation can be performed at a temperature of, for example, 25° C. or below (for example, below −30° C.), such as −56° C.) and/or for a predetermined amount of time (e.g., at least 1 hour, such as at least 10 hours, or about 12 hours). The resulting foam can have a lamellar structure/microstructure (see also FIGS. 2a-2d and 4a-4d).

In a particular embodiment, the slurry preparation can include vortex mixing of the freezing agent, the binder, and the dispersant, followed by adding the primary material and vortex mixing again. Bath sonication (and/or tip sonication) can optionally be performed to give the prepared slurry.

A vacuum-assisted infiltration procedure can be used to develop a foam-polymer composite. A liquid polymer (e.g., polydimethylsiloxane (PDMS)) can be poured onto the 3D foam (e.g., hybrid BNNT/BNNP foam) at a pressure in a range of from 0.8 atmosphere (atm) to 1.2 atm (e.g., 1 atm or about 1 atm) (temperature in a range of, for example, 20° C. to 30° C.). The pressure is then significantly lowered to be less than 1000 Pascal (Pa) (e.g., less than 100 Pa, less than 10 Pa, about 1 Pa, or 1 Pa). This results in the infiltration (e.g., total infiltration) of the 3D foam (e.g., foam) with liquid polymer to create a strong interface between the reinforcement foam and the matrix of the polymer. The polymer is forced into pores of the foam by pouring the liquid polymer over the foam and decreasing the pressure to a very low pressure (e.g., less than 10 Pa). The well-dispersed foam-polymer composite has enhanced thermal, mechanical, electrical, and/or radiation shielding properties. The foam-polymer composite can be non-porous and/or fully dense (i.e., the polymer can fully infiltrate the foam such that the foam-polymer composite has no pores). After the infiltration, the mixture can be heated (e.g., to a temperature of greater than 25° C. (for example, greater than 70° C.), such as 100° C. or about 100° C.) for a set period of time (e.g., at least 20 minutes, such as 35 minutes or about 35 minutes) to cure the polymer and give the final foam-polymer composite.

Without embodiments of the subject invention, BNNT and/or BNNP reinforcement of polymer matrices would be limited to mechanical shear and chemical dispersion techniques. Mechanical shear techniques include vortex or melt mixing, ball milling, bath sonication, and tip sonication; chemical dispersion techniques involve acid functionalization. These methods have significant limitations. Due to the π-π interactions between BNNTs and BNNPs, the particles tend to agglomerate. In other words, the nanoparticle dispersion within the polymer matrix tends to be poor and uneven using these other methods. This clustering limits the interfacial interaction between the filler and the polymer by preventing or inhibiting uniform nanomaterial distribution. Thus, relying on mechanical shear force to disperse BNNTs and BNNPs particles is not viable for high-quality composites. Also, the chemical dispersion approaches involve highly toxic acids that are not environmentally friendly and hinder their processing scalability. Thus these other methods to fabricate BNNT- and/or BNNP-reinforced polymer composites are non-scalable, expensive, time-consuming, and likely to result in non-uniform structures. These circumstances demonstrate the need for a facile and scalable processing route for well-dispersed BNNT- and/or BNNP-polymer composites. High-quality, non-agglomerated BNNT/BNNP-polymer composites cannot be fabricated through related art methodologies. The main challenge with these processing techniques is that due to nanoparticle agglomeration, the mechanical, thermal, and electrical properties are hindered. These nanoparticle clusters result in stress concentration locations and severely deteriorating mechanical properties. Similarly, BNNT/BNNP agglomerates result in phonon and electron scattering centers, which, in turn, lower the thermal and electrical conductivities of the composites. In addition, in terms of neutron radiation shielding properties, the non-uniform dispersion of the BN-based nanoparticles decreases the neutron absorption exposed surface. Consequently, the full neutron radiation shielding potential of the BNNTs and BNNPs is underutilized. Therefore, BNNT/BNNP aggregates have a negative effect on the composite performance when attempted to be fabricated by methods other than those of embodiments of the subject invention.

Through the use of freeze-drying, embodiments of the subject invention overcome the BNNT/BNNP particle agglomeration challenges. Freeze-drying assembles BNNT/BNNP nanoparticles into well-dispersed, rigid, and free-standing 3D networks (e.g., foams). Further, freeze-drying allows the design of the foam pore size, morphology, and orientation. The foam nanotubes, nanoplatelets, and pores can be engineered and aligned in the desired directions by manipulating thermodynamic freeze-drying processing parameters. These pore morphologies can be designed according to application-based thermal management, mechanical stress distribution, and radiation shielding requirements. The thermal properties of the foam can be tailored by designing phonon transfer pathways across the 1D/2D material interconnected network. Similarly, mechanical properties can be designed by strategically distributing foam branches and interconnecting nodes to facilitate load transfer. In turn, neutron radiation shielding properties can be enhanced by strategically orienting the 2D nanoplatelet basal planes to maximize their exposure to the neutron radiation source.

These foams are the backbone of polymer composites (e.g., nanocomposites) of embodiments of the subject invention, which have tailorable thermal conductivity, structural stability, and neutron radiation shielding properties. The rigid, free-standing foam pores can be infiltrated with a polymer (e.g., a viscous polymer (e.g., viscosity of at least 5 Pascal-seconds (Pa-s) or a polymer with a low viscosity (e.g., 5 Pa-s or less, such as 3.5 Pa-s or less)) in a liquid form (e.g., a solution of the polymer) to form foam-polymer composites (e.g., BNNT/BNNP foam-polymer composites). The high surface area of 1D and 2D materials facilitates the construction of evenly distributed networks that enable effective phonon transfer, mechanical stress distribution, and neutron radiation absorption.

Embodiments of the subject invention provide facile and scalable fabrication of rigid free-standing foams (e.g., hybrid 1D/2D foams, such as hybrid BNNT/BNNP foams), which can be used as a nanofiller network for any material class, such as polymers, metals, and ceramics. Embodiments can provide complete infiltration of low-density viscous polymers (e.g., $\rho_{PDMS}$=0.96 grams per cubic centimeter (g/cc)) in an ultra-low density foam (e.g., $\rho_{BNNP\ Foam}$=0.05 g/cc) via a vacuum-assisted infiltration process. Embodiments provide thermally conductive foams that significantly improve the thermal conductivity of foam-polymer nanocomposites via the phonon conduction mechanism (see, e.g., FIGS. 6a-6c, which shows a 204.2% improvement). Embodiments provide mechanically enhancing foams that significantly improve the elastic modulus of foam-polymer nanocomposites via stress transfer through the interconnected foam walls (see, e.g., FIGS. 7a-7b, which shows a 188.6% improvement). Embodiments provide free-standing foams with a mass absorption of at least 5 square centimeters per gram ($cm^2/g$) (e.g., more than 10 $cm^2/g$, such as 14.47 $cm^2/g$ or about 14.47 $cm^2/g$) under neutron radiation, such as under a neutron-emitting source (e.g., an americium—beryllium (Am/Be) neutron-emitting source) of 1 Curie (see also FIGS. 8a-8b).

Embodiments of the subject invention can be applied in many fields, including but not limited to electronic packaging, radiation shielding technologies, thermal management materials, machine parts (e.g., bearings and bushings), mechanical fittings and joints, structural materials, solid lubricants, aerospace components, automobile structures, and aeronautic parts. Embodiments of the subject invention provide fabrication methods that are highly versatile as they can be adapted to fabricate composites of multiple material systems. Further, the fabrication methods are facile, affordable, and scalable. The fabrication methods enable many BN nanomaterial-polymer composites.

In embodiments, the primary material can comprise 1D BNNTs and 2D BNNPs. The low coefficient of friction of BNNTs and BNNPs can be applied to solid lubrication technologies. These properties can bring value to the field of structural materials for aerospace and automobile applications. Another application is as mechanically-reinforcing BNNT/BNNP foams for polymer technologies that require structural strength while remaining lightweight. Additionally, BN-based materials are excellent nanofiller candidates for electronic packaging, as they can avoid short circuits and maintain signal integrity. Also, the BN-based nanofiller foams can be applied to thermal management technologies.

Embodiments of the subject invention do not require any organic solvents, hazardous surfactants, or hazardous dispersants (i.e., the fabrication methods and resulting foams and composites can be free from any organic solvents, hazardous surfactants, and/or hazardous dispersants). Instead, the fabrication methods can use solid loading (e.g., 1D BNNT and/or 2D BNNP particles) and a freezing agent, as well as optionally a binding agent and/or a non-hazardous dispersing agent (e.g., CMC or CMC sodium (Na)). Embodiments are non-toxic and environmentally friendly.

In embodiments of the subject invention, dispersion of the primary material (e.g., 1D and/or 2D materials) in the prepared slurry can be achieved via vortex mixing, bath sonication, and/or tip sonication. These mixing processes are controllable, facile, and easily scaled up from laboratory to industry.

In embodiments of the subject invention, the freeze-drying of the foams offers the ability to design the scaffold microstructure to tailor the foam-polymer composite properties. The foam structure can be designed by manipulating the process heat transfer, such as initial slurry temperature, mold material and/or geometry, and/or slurry composition.

In embodiments of the subject invention, the vacuum-assisted infiltration technique can result in the total infiltration of the material of the foam (e.g., the nanomaterial of the foam, such as BNNTs and/or BNNPs) with liquid polymer to create a strong interface between the reinforcement foam and the polymer matrix. By pouring the liquid polymer over the foam and decreasing the pressure to less than 10 Pa (e.g., 1 Pa or about 1 Pa), the polymer is forced into pores of the foam. Curing of the infiltrated liquid polymer can optionally be performed to finalize the foam-polymer composite. The unique combination of freeze-drying and vacuum-assisted infiltration unlocks the possibility of producing lightweight, highly thermally conductive, mechanically strong, and neutron radiation shielding foam-polymer composites (e.g., BNNT/BNNP-polymer composites).

Embodiments of the subject invention provide rigid, free-standing 3D foams. The foam can comprise highly hierarchical interconnected walls and branches produced during freeze-drying (i.e., the structure of the foam is affected by the fabrication method). The microstructure of the foam can include lamellar structures. The porosity of the foam can be, for example, at last 80% (e.g., at least 85%, at least 90%, at least 91%, at least 92%, at least 93%, at least 94%, at least 95%, at least 96%, at least 97%, at least 97.5%, or at least 98%). For example, the porosity of the foam can be 97.5% or about 97.5%. The foam can be, for example, a BNNP foam or a hybrid BNNT/BNNP foam.

When ranges are used herein, combinations and subcombinations of ranges (e.g., any subrange within the disclosed range) and specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

PDMS-BNNP composites were fabricated. A BNNP foam was fabricated via freeze-drying with a slurry of the following composition: 93 wt. % deionized water (freezing agent), 4 wt. % BNNP nanoplatelets (solid loading), 2 wt. % SBR (binding agent), and 1 wt. % CMC (dispersing agent). In order to begin the process, the deionized water, SBR, and CMC solution were vortex mixed at 500 revolutions per minute (rpm) for 1 hour. Subsequently, the BNNP powder was added, and the mixture was vortex mixed for 30 minutes. Then, the freeze-drying slurry was bath sonicated for 15 minutes. Once the dispersion process was carried out, the solution was frozen at a temperature of −56° C. and a pressure of 1 atm for 4 hours. After freezing, the solid structure was sublimated at a temperature of −56° C. and a pressure of 1 Pa for 12 hours. The resulting BNNP foam presented a lamellar structure, as seen in FIGS. 2a-2d. The BNNP foam had a porosity of 97.5%. The freeze-dried BNNP foam (3.5 vol %) was infiltrated with liquid PDMS (96.5 vol %). Liquid PDMS was poured on top of the BNNP foam, and the mixture was subjected to low-pressure conditions of 1 Pa. Subsequently, the liquid PDMS-infiltrated BNNP foam was heated to 100° C. for 35 minutes to cure the PDMS and fully finalize the composite production. As shown in FIGS. 3a-3d, the polymer fully infiltrated the BNNP foam pores resulting in a highly dense and nonporous composite. No pores were present in the final PDMS-BNNP composite. This demonstrates that the fabrication method can be applied (at least) with liquid polymers of similar or lower viscosity than PDMS (3.5 Pa-s).

Figure 6A:
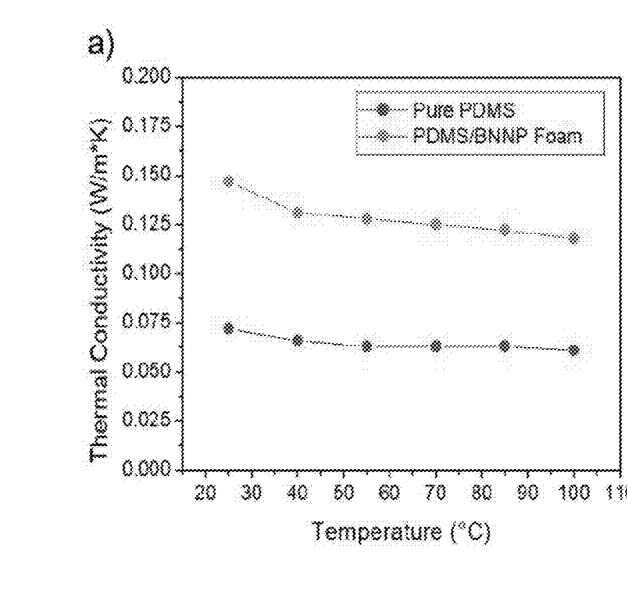
FIG. 6a shows a plot of thermal conductivity (in Watts per meter per Kelvin (W/m-K)) versus temperature (in degrees Celsius (° C.)) measured via flash diffusivity. The curve with the higher thermal conductivity values is for PDMS-infiltrated BNNP foam, and the curve with the lower thermal conductivity values is for pure PDMS.
Figure 6B:
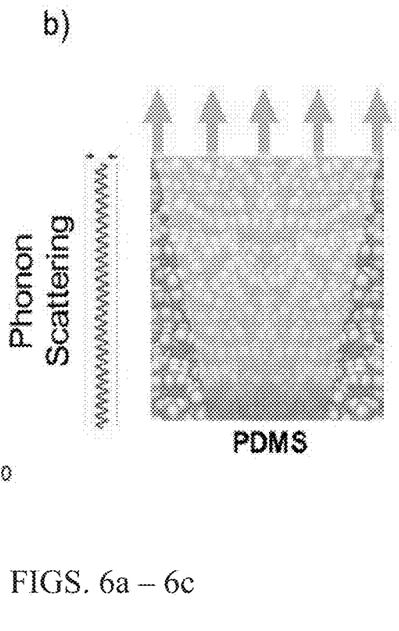
FIG. 6b shows a representation of thermal conductivity of pure PDMS.
Figure 6C:
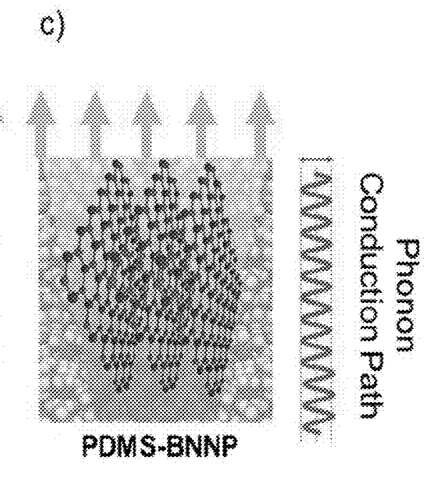
FIG. 6c shows a representation of thermal conductivity of PDMS-infiltrated BNNP foam.
Figures 7A, 7B:
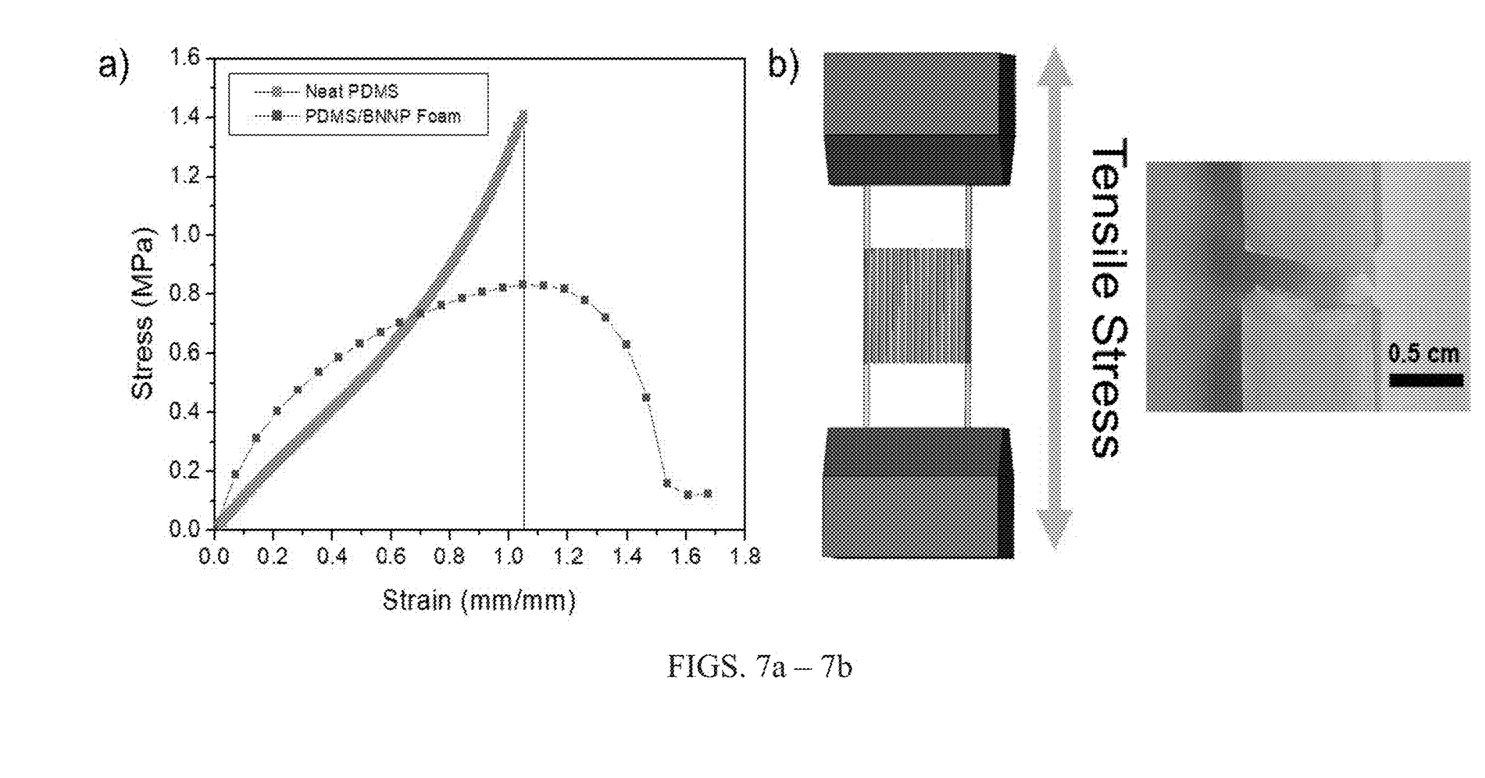
FIG. 7a shows mechanical characterization via tensile testing, showing a plot of stress (in megapascals (MPa)) versus strain (in mm per mm (mm/mm)). The curve with the highest stress value at a strain of 1.0 mm/mm is for neat PDMS; and the curve with the lowest stress value at a strain of 1.0 mm/mm is for PDMS-infiltrated BNNP foam. The inset plot shows more detail on the $WS_2$ foam curve. The image in the top-right corner of the plot shows the direction of the tensile stress.
FIG. 7b shows the direction of the tensile stress during the tensile testing from FIG. 7a (left side of FIG. 7b) and an image of PDMS-infiltrated BNNP foam after failure during the tensile testing from FIG. 7a (right side of FIG. 7b).
Figures 8A, 8B:
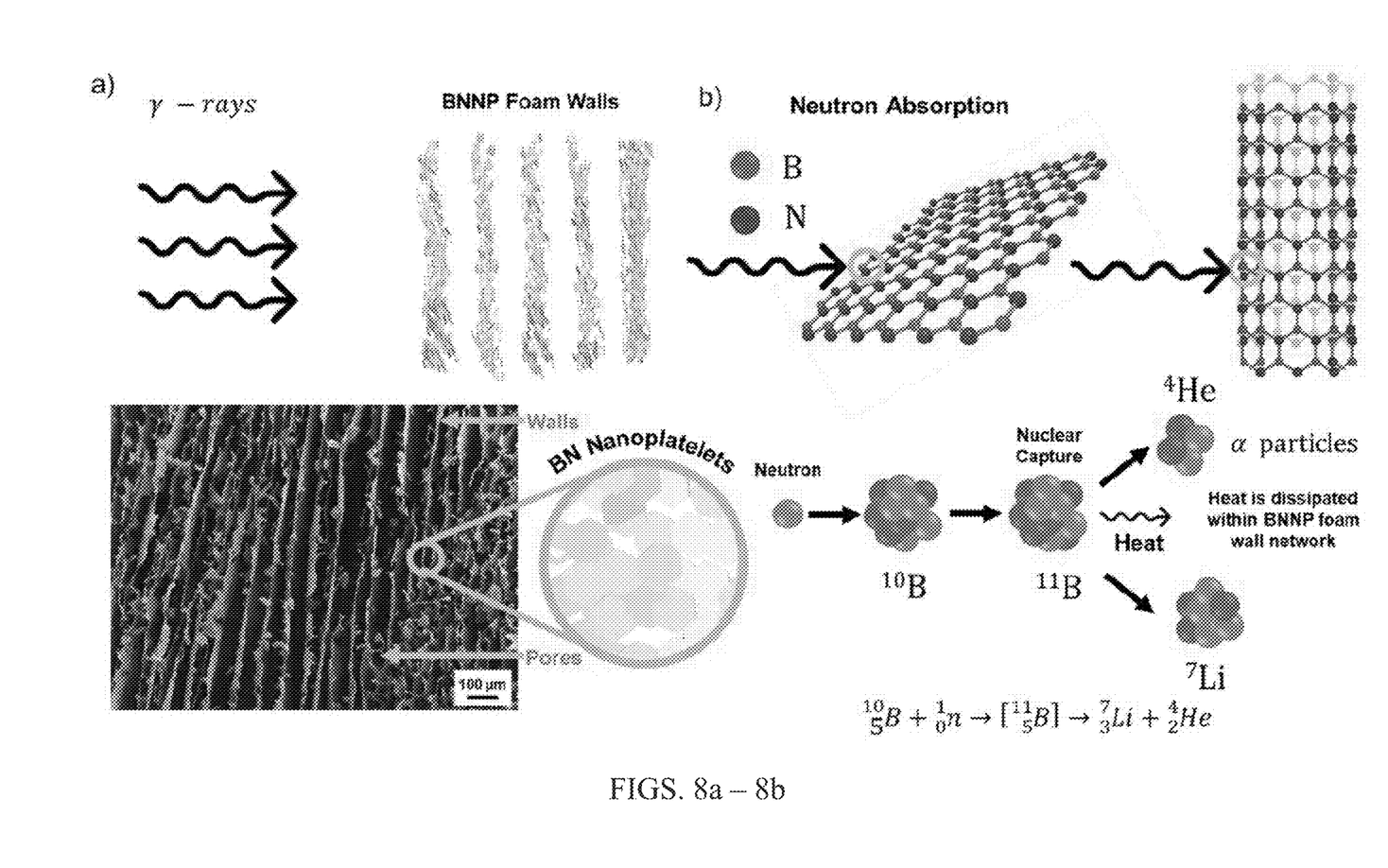
FIG. 8a shows a representation of macro-scale interaction between gamma rays (γ-rays) and BNNP foam, demonstrating neutron radiation shielding of BNNP foams. In the image at the bottom-left corner of FIG. 8a, the scale bar is 100 μm.
FIG. 8b shows a representation of the atomic-scale neutron absorption mechanism of BNNP foam.

In order to test the reinforcing ability of the developed BNNP foam, the PDMS-BNNP composites were characterized in terms of their thermal, mechanical, and radiation shielding properties. FIGS. 6a-6c show thermal conductivity of pure PDMS and the PDMS-WS$_2$ composite, measured via flash diffusivity. FIGS. 7a-7b show mechanical characterization results of the PDMS-BNNP composites, measured via tensile testing. The free-standing BNNP foams presented a mass absorption of 14.47 cm$^2$/g under neutron radiation under an Am/Be neutron-emitting source of 1 Curie (see also FIGS. 8a-8b).

The experimental thermal conductivities measured via flash diffusivity of neat PDMS and PDMS-infiltrated BNNP foam yielded $$\kappa_{PDMS} = 0.07 \pm 0.01 \frac{W}{m \cdot K}$$

and $$\kappa_{PDMS/BNNP} = 0.15 \pm 0.01 \frac{W}{m \cdot K},$$

respectively, as seen in FIGS. 6a-6c, where κ represents thermal conductivity. The thermal conductivity of PDMS-infiltrated BNNP foam was 204.2% higher than that of pure PDMS. This thermal conductivity enhancement can be explained by the fact that in neat PDMS, no phonon pathways enable heat transfer. Instead, the phonons are scattered along the polymer chains, as seen in FIG. 6b. On the other hand, in the PDMS-infiltrated BNNP foam, the BNNP foam walls provide an uninterrupted pathway for phonon conduction, as seen in FIG. 6c.

The macro-scale tensile tests of the composites demonstrated that the Young's Modulus of PDMS-infiltrated BNNP foam was 188.6% higher than that of pure PDMS, $$E_{PDMS} = 1.14 \pm 0.2 \text{ MPa},$$

while $$E_{PDMS/BNNP} = 2.15 \pm 0.4 \text{ MPa},$$

where E represents Young's Modulus and MPa is megapascals. This mechanical property enhancement is attributed to the interconnected BNNP network providing a continuous pathway that enables mechanical stress transfer between the foam walls. In contrast, neat PDMS singularly relies on the polymer chain strength, as observed in FIGS. 7a-7b.

The fabrication route proved to produce composites of higher quality than the current gold standards used for BNNP-polymer composites. The fabrication route also allows the design of the BNNP foam microstructure to tailor the resulting composite properties. The fabrication technique is highly scalable and versatile to form composites of multiple material systems (e.g., epoxy, polyurethane, and shape memory polymers). Further, this fabrication route is highly affordable and enables high throughput production. BN-polymer nanocomposites can find applications in electronic packaging, structural components, and radiation shielding technologies. All these fields can improve the thermal and mechanical performance of their technologies by adopting the herein-described BN-polymer processing route.

EXAMPLE 2

Hybrid BNNT/BNNP foams were fabricated. The BNNT/BNNP foam was fabricated via freeze-drying with a slurry of the following composition: 93 wt. % deionized water (freezing agent), 2 wt. % 1D BNNT nanotubes (solid loading), 2 wt. % 2D BNNP nanoplatelets (solid loading), 2 wt. % SBR (binding agent), and 1 wt. % CMC (dispersing agent). In order to begin the process, the deionized water, SBR, and CMC solution were vortex mixed at 500 rpm for 1 hour. Subsequently, the BNNT and BNNP powders were added, and the mixture was vortex mixed for 30 minutes. Then, the freeze-drying slurry was tip sonicated (19 mm tip diameter, 40% amplitude, 15 s pulse, 6 pulses). Once the dispersion process was carried out, the solution was frozen at a temperature of −56° C. and a pressure of 1 atm for 4 hours. After freezing, the solid structure was sublimated at a temperature of −56° C. and a pressure of 1 Pa for 12 hours.

The resulting BNNT/BNNP foam presented a lamellar structure, as seen in FIGS. 4a-4d. As seen in FIGS. 5a-5d, the BNNTs and BNNPs were evenly distributed, and the structure was well-defined. This demonstrates that the fabrication method can be applied to 1D/2D nanomaterial systems.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a foam, the method comprising:
    preparing a slurry of slurry components, the slurry components comprising a freezing agent and a primary material of the foam; and
    freeze-drying the slurry at a temperature below 25° C. to give the foam comprising the primary material,
    the primary material comprising a first material that is a two-dimensional (2D) nanomaterial and a second material that is a one-dimensional (1D) nanomaterial,
    the foam being free-standing,
    the foam comprising a lamellar microstructure,
    the first material being boron nitride nanoplatelets (BNNP),
    the second material being boron nitride nanotubes (BNNT), and
    the foam being a hybrid BNNT/BNNP foam.

2. The method according to claim 1, the preparing of the slurry comprising vortex mixing and sonication of the slurry components.

3. The method according to claim 1, the temperature of the freeze-drying of the slurry being below −30° C.

4. The method according to claim 1, the freeze-drying comprising freezing the slurry and sublimation of at least a part of the slurry.

5. The method according to claim 1, the freezing agent being deionized water.

6. The method according to claim 1, the slurry components further comprising a binding agent and a dispersing agent.

7. The method according to claim 1, the foam having a porosity of at least 80%.

8. A method of fabricating a foam-polymer composite, the method comprising:
    performing the method according to claim 1 to form a foam;
    pouring a liquid polymer on the foam within a reaction chamber, a pressure of the reaction chamber being at least 0.5 atmosphere (atm) during the pouring of the liquid polymer;
    lowering the pressure of the reaction chamber to less than 100 Pascal (Pa) such that a matrix of the liquid polymer infiltrates the foam in a non-agglomerated fashion to give a foam-polymer mixture; and
    heating the foam-polymer mixture to cure the polymer and give the foam-polymer composite.

9. The method according to claim 8, the liquid polymer fully infiltrating the foam such that the foam-polymer composite has no pores.

10. A method of fabricating a hybrid boron nitride nanotubes (BNNT)/boron nitride nanoplatelets (BNNP) foam (hybrid BNNT/BNNP foam), the method comprising:
    preparing a slurry of slurry components, the slurry components comprising a freezing agent and a primary material of the hybrid BNNT/BNNP foam; and
    freeze-drying the slurry at a temperature below −30° C. to give the hybrid BNNT/BNNP foam comprising the primary material,
    the primary material comprising BNNT and BNNP,
    the hybrid BNNT/BNNP foam being free-standing,
    the hybrid BNNT/BNNP foam comprising a lamellar microstructure,
    the preparing of the slurry comprising vortex mixing and sonication of the slurry components,
    the freeze-drying comprising freezing the slurry and sublimation of at least a part of the slurry,
    the freezing agent being deionized water, and
    the hybrid BNNT/BNNP foam having a porosity of at least 95%.

11. A method of fabricating a foam-polymer composite, the method comprising:
    performing the method according to claim 10 to form a hybrid BNNT/BNNP foam;
    pouring a liquid polymer on the hybrid BNNT/BNNP foam within a reaction chamber, a pressure of the reaction chamber being at least 0.5 atmosphere (atm) during the pouring of the liquid polymer;
    lowering the pressure of the reaction chamber to less than 10 Pascal (Pa) such that a matrix of the liquid polymer infiltrates the hybrid BNNT/BNNP foam in a non-agglomerated fashion to give a foam-polymer mixture; and
    heating the foam-polymer mixture to cure the polymer and give the foam-polymer composite,
    the liquid polymer fully infiltrating the hybrid BNNT/BNNP foam such that the foam-polymer composite has no pores, and
    the polymer having a viscosity of no more than 5 Pascal-seconds (Pa-s).

* * * * *